(12) United States Patent
Wilhelm et al.

(10) Patent No.: US 11,187,668 B2
(45) Date of Patent: Nov. 30, 2021

(54) SENSOR ELEMENT AND METHOD FOR MANUFACTURING A SENSOR ELEMENT

(71) Applicant: Endress+Hauser Conducta GmbH+Co. KG, Gerlingen (DE)

(72) Inventors: Thomas Wilhelm, Chemnitz (DE); Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 47 days.

(21) Appl. No.: 16/135,150

(22) Filed: Sep. 19, 2018

(65) Prior Publication Data

US 2019/0086357 A1 Mar. 21, 2019

(30) Foreign Application Priority Data

Sep. 21, 2017 (DE) ...................... 10 2017 121 914.5

(51) Int. Cl.
*G01N 27/333* (2006.01)
*G01N 27/403* (2006.01)

(52) U.S. Cl.
CPC ....... *G01N 27/333* (2013.01); *G01N 27/3335* (2013.01); *G01N 27/4035* (2013.01)

(58) Field of Classification Search
CPC ... G01N 27/333; G01N 27/4035; G01N 27/31
See application file for complete search history.

(56) References Cited

U.S. PATENT DOCUMENTS

| 4,776,944 | A | 10/1988 | Janata et al. | |
| 5,183,549 | A * | 2/1993 | Joseph | G01N 27/4162 204/412 |
| 6,398,931 | B1 * | 6/2002 | Burchette | G01N 27/333 204/416 |
| 7,189,314 | B1 * | 3/2007 | Pace | G01N 33/1886 204/412 |
| 8,465,989 | B2 * | 6/2013 | Arie | C12Q 1/6818 436/526 |
| 8,620,398 | B2 * | 12/2013 | Feldman | G01N 27/301 600/345 |
| 2007/0144919 | A1 * | 6/2007 | Cheng | G01N 27/333 205/789 |
| 2010/0176006 | A1 * | 7/2010 | Bickford | G01N 27/333 205/792.5 |
| 2017/0184583 | A1 * | 6/2017 | Beaumont | G01N 33/54366 |

* cited by examiner

*Primary Examiner* — Luan V Van
*Assistant Examiner* — Caitlyn Mingyun Sun
(74) *Attorney, Agent, or Firm* — Christopher R. Powers; Endress+Hauser (USA) Holding Inc.

(57) ABSTRACT

The present disclosure includes to a sensor element including a membrane having a first functionalized region and a second functionalized region and including a sensor element body on which the membrane rests. The sensor element body has at least one electrically conductive first conductor and an electrically conductive second conductor electrically insulated from the first conductor. The first conductor is electrically and/or electrolytically conductively connected to the first functionalized region of the membrane, and the second conductor is electrically and/or electrolytically conductively connected to the second functionalized region of the membrane. In another aspect of the present disclosure, a method for fabricating such a sensor element is disclosed.

16 Claims, 5 Drawing Sheets

SENSOR ELEMENT AND METHOD FOR MANUFACTURING A SENSOR ELEMENT

CROSS-REFERENCE TO RELATED APPLICATION

The present application is related to and claims the priority benefit of German Patent Application No. 10 2017 121 914.5, filed on Sep. 21, 2017, the entire contents of which are incorporated herein by reference.

TECHNICAL FIELD

The present application relates to a sensor element and a method for manufacturing a sensor element.

BACKGROUND

Sensors are regularly used in analytical measuring to determine measurands correlated with the concentration of an analyte in a measuring medium such as the concentration or activity of the analyte, the concentration or activity of one or more substances that are chemically or biochemically converted into the analyte, or cumulative parameters that depend upon the concentration of several different analytes. Such sensors can be designed as inline sensors which can be integrated into a process vessel containing the measuring medium and brought into direct contact with the measuring medium, for example, by immersion. A fluid, e.g., a measuring liquid or a measuring gas, comes into consideration as the measuring medium. The measuring medium may be a solution containing the analyte or a substance and/or phase mixture which may comprise solid, liquid, and gaseous phases, for example, a suspension, a gel, a foam or an emulsion.

A group of such inline sensors are, for example, potentiometric sensors with ion-selective electrodes ("ISE"), hereinafter also referred to as ISE sensors. Such sensors can detect the concentration or activity of ions in a measuring medium. They typically comprise a measuring half-cell, designed as an ion-selective electrode, and a reference half-cell, as well as a sensor circuit. In contact with the measuring medium, the measuring half-cell forms a potential that is a function of the activity of the analyte, whereas the reference half-cell provides a stable reference potential independent of the analyte concentration. The sensor circuit is connected in an electrically conductive manner to a discharge element of the measuring half-cell and a reference element of the reference half-cell and generates a measurement signal, which represents the difference in potential between the measuring half-cell and the reference half-cell. The measurement signal may, if needed, be output by the sensor circuit to a superordinate unit, such as a measuring transducer, which superordinate unit is connected to the sensor and further processes the measurement signal.

The reference half-cell of ISE sensors is conventionally designed as an electrode of the second type, whose potential only indirectly depends upon the composition of the measuring medium, for example, upon the activity of the analyte in the measuring medium. An example of such a reference half-cell designed as an electrode of the second type is the silver/silver chloride electrode. The aforementioned reference element, connected to the sensor circuit, of the reference half-cell is in contact with a reference electrolyte. The reference element is made of a metal, wherein at least part of the surface of the reference element has a coating consisting of a poorly-soluble salt of the metal. The reference electrolyte is generally a saturated solution of this poorly-soluble salt. In addition, the reference electrolyte contains a high concentration of the anion of the poorly-soluble salt, generally, in the form of an alkali salt. The potential of an electrode of the second type depends upon the concentration of the cation of the poorly-soluble salt in the reference electrolyte. Due to the very high anion concentration in the reference electrolyte, the concentration of the cation of the poorly-soluble salt, and thus the potential of the reference half-cell, remains substantially constant. The reference electrolyte is accommodated in a chamber formed in a housing of a reference half-cell. The reference electrolyte must be in electrolytic contact with the measuring medium to perform a potentiometric measurement. This contact is established by a junction which may consist of, e.g., a hole that passes through the entire housing wall, a porous diaphragm, or a gap.

The ion-selective electrode serving as a measuring half-cell has an ion-selective membrane. The ion-selective membrane can be configured, for example, as a polymer membrane which is functionalized with an ion exchanger or an ionophore which interacts chemically and/or physically with the analyte, for example, by complexing the analyte. When the membrane contacts the measuring medium, a difference in potential, which depends upon the difference between the activity of the analyte in the measuring medium and in the membrane, forms at the boundary surface between the membrane surface and the measuring medium as a result of the exchange of the analyte between the phases lying against the boundary surface. This difference in potential determines the measuring half-cell potential that can be detected by the sensor circuit using a conductor contacting the membrane in an electrically or electrolytically conductive manner.

Conventional ISE sensors have a single ISE, serving as a measuring half-cell, and a reference half-cell. With such an ISE sensor, only a single measurand, i.e., a single ion concentration or ion activity, can thus be measured. If several analytes are to be monitored in a measuring medium, several such ISE sensors are, correspondingly, required.

EP 2 284 531 A1 discloses a water analysis immersion probe which comprises at least two sensors for determining various water parameters and which has a sensor module receptacle having at least two sensor module slots and at least two sensor modules each having a sensor, wherein the sensor modules are plugged in the slots. The sensor modules may be ion-selective electrodes. In this way, a desired combination of sensors for the water analysis immersion probe can be assembled for a particular application.

If, as described in EP 2 284 531 A1, individual sensor modules for measuring different parameters are combined in a single immersion probe, the immersion probe still requires a relatively large amount of space. In addition, the structure of the immersion probe described in EP 2 284 531 A1 with the individual exchangeably designed sensor modules is relatively complex, and thus complex and costly to produce.

SUMMARY

In contrast, the aim of the present disclosure is to provide a miniaturized sensor element that can be produced at low cost. This aim is achieved by the sensor element according to claim 1 and the method for producing a sensor element according to claim 16.

The sensor element according to the present application includes a membrane, for example, a polymer membrane, which has a first functionalized region and a second functionalized region, and a sensor element body on which the membrane rests, wherein the sensor element body has at least one electrically conductive first conductor and an electrically conductive second conductor which is separate from the first conductor, for example, electrically insulated from the first conductor, and wherein the first conductor is electrically and/or electrolytically conductively connected to the first functionalized region of the membrane, and wherein the second conductor is electrically and/or electrolytically conductively connected to the second functionalized region of the membrane.

The disclosed structure, with a membrane having at least two or more functionalized regions and resting on a sensor element body, is structurally very simple and enables a miniaturized sensor element in which a plurality of individual ion-selective electrodes is formed. The conductors serve to discharge the potential developing in each case at a functionalized partial region of the membrane in contact with a measuring medium.

A functionalized region of a membrane is understood to mean a region of the membrane which comprises molecules contained in the membrane or functional groups bonded to the membrane, wherein the molecules or the functional groups physically or chemically interact with a certain analyte, for example, a specific ion. For example, the molecules or functional groups can bind or complex the analyte or undergo a chemical reaction with the analyte. Due to this interaction of the analyte with the molecules or functional groups present in the functionalized region of the membrane, the potential dependent upon the activity of the analyte in the measuring medium can develop at the boundary surface between this partial region of the membrane and a measuring medium contacting the partial region of the membrane and can be detected at the conductor against a reference potential, for example, in a currentless manner. The at least two or several ion-selective electrodes formed in this way can correspondingly each form a potentiometric ISE sensor together with a reference element which supplies a reference potential.

The first functionalized region of the membrane of the sensor element according to the present application can thus comprise first molecules contained in the membrane or first functional groups bonded to the membrane, which molecules or functional groups physically or chemically interact with a first analyte, and the second functionalized region can correspondingly comprise second molecules contained in the membrane or second functional groups bonded to the membrane, which molecules or functional groups physically or chemically interact with a second analyte different from the first analyte. The first or second analyte may be an ion; for example, the first analyte may be a first ion different from the second analyte, which may be a second ion. Accordingly, the first or second molecules can correspondingly in each case be an ionophore matched to the first or the second analyte.

For example, the first molecules or the first functional groups may have different chemical compositions than the second molecules or the second functional groups. This allows the determination of the concentrations or activities of different ionic analytes or of a single ionic analyte by means of differently functionalized membrane regions of one and the same sensor element. However, it is also possible for the first molecules or the first functional groups and the second molecules and the second functional groups to have the same chemical composition.

In a first embodiment, the conductors may electrically contact the functionalized regions of the membrane as solid conductors via an electrically and/or ionically conductive polymer.

In an alternative second embodiment, the conductors can be electrolytically conductively connected to the functionalized regions of the membrane via a liquid electrolyte solution, which may be thickened by a polymer additive. In this case, a charge transport between the membrane and the electrically conductive conductor takes place via the electrolyte solution.

In a first variant of the first embodiment, the sensor element body can have a surface on which a polymer layer is arranged, wherein the polymer layer has at least one electrically and/or ionically conductive first partial region and an electrically and/or ionically conductive second partial region, and wherein the membrane rests on the polymer layer, and the first partial region of the polymer layer contacts the first functionalized region of the membrane, and the second partial region of the polymer layer contacts the second functionalized region of the membrane.

The first and second partial regions of the polymer layer may be formed from a doped, intrinsically conductive polymer. Regions of the polymer layer arranged between the partial regions can be electrically insulating or have at least a considerably lower electrical conductivity than the doped partial regions of the polymer layer. In this way, the first and second partial regions can be electrically insulated from one another.

An intrinsically conductive polythiophene or polythiophene derivative, an intrinsically conductive polyaniline or polyaniline derivative, an intrinsically conductive polypyrrole or polypyrrole derivate, an intrinsically conductive polyparaphenylene or polyparaphenylene derivate, for example, comes into consideration here as intrinsically conductive polymer. In at least one embodiment, the intrinsically conductive polymer may be poly(3,4-ethylenedioxythiophene) doped with polystyrene sulfonate (PEDOT:PSS).

Alternatively, the polymer layer can be formed by at least two island-shaped, separate and electrically insulated layer elements of an electronically and/or ionically conductive polymer, wherein a first island-shaped layer element forms the first partial region of the polymer layer, and a second island-shaped layer element forms the second partial region of the polymer layer. Insulating webs made of another material, for example, of an electrically insulating polymer material, can be arranged between the island-shaped layer elements in order to electrically insulate the island-shaped layer elements from one another.

The polymer layer may, for example, be formed as a closed layer of an intrinsically conductive polymer which is doped in the first partial region and in the second partial region, so that it is electrically and/or ionically conductive in the first partial region. Regions of the closed layer arranged between the doped partial regions are in this case not doped and have a correspondingly considerably lower electrical conductivity than the doped partial regions, thus ensuring electrical insulation of the first and the second partial regions with respect to one another.

The sensor element body may have a substantially planar surface in which at least two depressions forming cavities separated from one another are formed, wherein the membrane abuts against the substantially planar surface of the sensor element body and closes the cavities, and a first one of the cavities is covered at least by a partial region of the first functionalized region of the membrane, and a second of the cavities is covered at least by a partial region of the second functionalized region of the membrane.

A sensor element body designed in this way may enable a conductor connected electrolytically to a functionalized region of the membrane according to the aforementioned second embodiment of the conductor. It can also be used to realize a further variant of a solid conductor.

The sensor element can thus comprise a first electronically and/or ionically conductive polymer filling the first cavity and contacting the first functionalized region of the membrane on the rear side, and a second electronically and/or ionically conductive polymer filling the second cavity and contacting the second functionalized region of the membrane on the rear side, wherein the first conductor is in contact with the first polymer, and the second conductor is in contact with the second polymer, and wherein the first and second conductors are each electrically conductively connected to an electrical contact point arranged outside the cavity, for example, to an electrical plug connector element. In such an embodiment, a doped, intrinsically conductive polymer, for example, one of those mentioned above, comes into consideration as the first and/or second polymer.

Alternatively, the sensor element can comprise a first internal electrolyte contained in the first cavity and contacting the first functionalized region of the membrane on the rear side, and a second internal electrolyte contained in the second cavity and contacting the second functionalized region of the membrane on the rear side, wherein the first conductor is in contact with the first internal electrolyte, and the second conductor is in contact with the second internal electrolyte, and wherein the first and second conductors are each electrically conductively connected to an electrical contact point arranged outside the cavity, for example, to an electrical plug connector element.

The first and second conductors themselves may, for example, have a portion designed as a conductor track on the surface of the sensor element body, which portion is in contact with the polymer layer and is electrically conductively connected to a contact point on a side of the sensor element body facing away from the membrane.

The sensor element body can comprise a base plate and a structure which is arranged on a front side of the base plate, forms the cavities, and is connected to the base plate, and wherein the first and second conductors are each electrically conductively connected to the electrical contact point via a through-connection running through the base plate. The electrical contact point can be a plug connector element, for example.

The sensor element may comprise a support structure, wherein the membrane is fixed between the surface of the sensor element body and the support structure abutting against a membrane rear side facing away from the surface of the sensor element body, wherein the support structure at least partially leaves exposed regions of the membrane that cover cavities.

Advantageously, the sensor element body can have a plurality of electronically conductive conductors which are electrically insulated from one another, wherein the membrane comprises a plurality of functionalized regions, and wherein each of the functionalized regions is respectively electrically and/or electrolytically conductively connected to one of the conductors. In such an embodiment, it is possible that the functionalized regions of the membrane are each differently functionalized, i.e., comprise different molecules or functional groups, so that concentrations or activities of a plurality of different ions can be detected by means of the sensor element. It is also possible for at least two regions to be functionalized in such a way that, although the molecules or functional groups present in the regions are different from one another, they bind or complex the same analyte. This allows the determination of two measured values for the same analyte concentration or analyte activity, which can be referenced against one another and/or used for plausibility considerations. All embodiments and embodiment variants described here on the basis of a sensor element whose membrane has a first and a second functionalized partial region can accordingly be transferred to a sensor element with a membrane having a plurality of such functionalized partial regions and a corresponding number of conductors.

The sensor element body may, for example, have a plurality of depressions which form cavities separated from one another, wherein the membrane comprises a plurality of functionalized regions, and wherein the membrane is connected to the sensor element body such that each of the cavities is covered at least by a partial region of a functionalized region of the membrane. Each of the cavities may furthermore comprise a conductor for discharging a half-cell potential developing at the boundary surface of the membrane to a measuring medium.

In this embodiment with a plurality of cavities, the sensor element body can have a two-dimensional, honeycomb-like structure, for example. For example, the cavities can each have a hexagonal or square cross-section, wherein adjacent cavities have at least one common side wall in each case. The cavities may also have a circular cross-section, wherein the cavities are arranged next to one another in a square arrangement or in a two-dimensional, hexagonally densest packing. The cavities may also be designed as honeycomb structures in a hexagonal arrangement.

The sensor element body can furthermore comprise at least one reference half-cell which provides a reference potential against which the potentials of the individual ion-selective electrodes formed by the functionalized regions of the membrane and the associated conductors can be detected.

The reference half-cell may be realized in that the sensor element has a cavity that is covered by the membrane and forms a reference half-cell. This cavity can be covered by a non-functionalized region of the membrane, wherein the region of the membrane covering the cavity has one or more openings, e.g., one or more pores, via which a reference electrolyte contained in the cavity is in electrolytic contact with a measuring medium in contact with the membrane. A reference element, for example, a metallic reference element, configured to discharge the reference potential can be arranged in the cavity designed as a reference half-cell.

The reference half-cell can also be realized in that the membrane comprises a partial region impregnated with an ion exchanger and/or a conducting salt, and that the sensor element comprises an additional electrically conductive conductor, which is electrically and/or ionically conductively connected to the membrane via a doped, intrinsically conductive polymer. The polymer can, for example, be one of the aforementioned doped, intrinsically conductive polymers. This variant of the reference half-cell is particularly suitable for combination with the above-described embodiments of the ion-selective electrodes with solid conductor.

Alternatively or additionally, the sensor element can comprise an auxiliary electrode, e.g., a pseudo-reference electrode, such as a metallic potential discharge element, which assumes the function of the reference half-cell. The auxiliary electrode may be formed from an electrically conductive material, such as a metal, e.g., silver, a metal alloy, e.g., stainless steel, or graphite. It can be realized, for example, in the form of a pin or wire fastened to the sensor element or to a sensor housing part. The auxiliary electrode can also be an electrically conductive housing part which can be brought into contact with the measuring medium for measurement. Advantageously, the auxiliary electrode or the pseudo reference electrode can be embedded in the sensor element body, for example, by injection. In this case, the sensor element body leaves exposed at least one surface of the auxiliary electrode or pseudo reference electrode, which can be brought into contact with a measuring medium for measurement.

This embodiment can be produced even more simply than the embodiment described above, in which the sensor element comprises a reference half-cell arranged in a cavity and designed as electrode of the second type, and can be used advantageously, for example, when one or more of the ion-selective electrodes serving as measuring half-cells detect an ion type whose concentration in the measuring medium can be assumed to be substantially constant. Even if only a concentration ratio of different analytes is to be determined with the sensor element, such a pseudo-reference is sufficient, since only the individual voltages between the individual measuring half-cells and the pseudo reference have to be related to one another.

If such an auxiliary electrode or pseudo reference electrode is present in addition to a reference half-cell designed as an electrode of the second type, the sensor can be designed to detect a redox potential in addition to determining the main measurands for example, one or more analyte concentrations. The sensor element can also have several auxiliary electrodes, for example, two or four identically designed auxiliary electrodes. By means of redundant measurements, these auxiliary electrodes can on the one hand ensure a higher reliability of the measurement result. On the other hand, the sensor can additionally be designed to determine the conductivity of the measuring medium by means of the auxiliary electrodes or potential discharge elements.

In particular, in webs between the cavities or in locations which are arranged below regions of the membrane that are not functionalized, the sensor element body can contain further functional elements, e.g., a temperature sensor, optical waveguide fibers or, for example, in the outside region not covered later by the membrane, electrically conductive regions which can serve, for example, as auxiliary electrodes. NTC, PT100, or PT1000 elements come into consideration as temperature sensors integrated into the sensor element body.

The present application also relates to a sensor with a sensor element according to one of the above-described embodiments and a sensor body, wherein the sensor body comprises a housing, connected, for example, releasably connected, to the sensor element, and a sensor circuit arranged at least partially in the housing, wherein the sensor circuit is electrically conductively connected to the first conductor and the second conductor and to a reference half-cell and is configured to generate, on the basis of a potential difference between the first conductor and the reference half-cell, a first measurement signal dependent upon a concentration of a first analyte in a measuring medium contacting the sensor element and to generate, on the basis of a potential difference between the second conductor and the reference half-cell, a second measurement signal dependent upon a concentration of a second analyte in the measuring medium.

The reference half-cell can be, for example, a reference electrode, for example, a reference electrode designed as a reference electrode of the second type, according to one of the embodiments described above, or an auxiliary electrode serving as a pseudo reference electrode, for example, according to one of the embodiments described above. The auxiliary electrode does not necessarily have to be a component of the sensor element; it can also be arranged on the sensor body, be a component of the sensor body or an independent electrode which is connected to the sensor circuit but is detached from the sensor body and which can be immersed in the measuring medium.

The sensor circuit may be designed to further process the first and second measurement signals or to output them to a further data processing device, e.g., a measuring transducer or an operating device, which is connected to the sensor circuit by wire or wirelessly. The sensor circuit can be arranged completely in the housing of the sensor body. However, it is also possible for a part of the sensor circuit to be contained in a second housing which is arranged so as to be detached from the sensor body.

The sensor circuit may furthermore be designed to be put into a regeneration mode intermittently from a measurement operation in which the sensor circuit generates measurement signals, wherein the sensor circuit is configured, in the regeneration mode, to apply a predetermined voltage between the reference element or an additional auxiliary electrode and the first and/or the second conductor. In this way, for example, in the described embodiments of the sensor element with solid conductors, interfering polarization effects occurring at the membrane can be compensated for.

The membrane can comprise a dye, for example, in the functionalized regions. The dye can, on the one hand, serve to mark the functionalized regions and, if appropriate, to differentiate them from one another if different dyes are used for different functionalized regions. On the other hand, the dye can also serve to monitor aging of the membrane. In this case, the dye is selected to be washed out of the membrane over time when in contact with a measuring medium, for example, in contact with an aqueous solution. The decrease in the color intensity or another optical property of the dye is then a measure of the amount of dye washed out of the membrane and, at the same time, a measure of the age of the sensor element. Advantageously, the sensor body can comprise an optical measuring transducer for monitoring the color intensity or the optical properties of the dye. The optical measuring transducer can comprise, for example, a radiation transmitter and a radiation receiver, wherein measuring radiation emitted by the radiation transmitter is converted in the membrane by interaction with the dye and converted measuring radiation is detected by the radiation receiver, to detect the color intensity or another optical property of the dye contained in the membrane. The sensor circuit can be designed to determine an age or a state of the sensor element based on a radiation receiver signal and/or to predict the remaining service life of the sensor element.

The present application also relates to a method for producing a sensor element according to one of the above-described embodiments. The method comprises the following steps:

Producing a membrane, for example, a polymer membrane, which has at least a first functionalized region and a second functionalized region;

Producing a sensor element body which has at least one electrically conductive first conductor and an electrically conductive second conductor which is separate from the first conductor, for example, electrically insulated from the first conductor; and Connecting the first conductor to the first functionalized region of the membrane and the second conductor to the second functionalized region of the membrane by means of an electrically and/or electrolytically conductive compound.

The production of the membrane may comprise the following steps:

Impregnating an untreated membrane in a first region with a first functionalization reagent, for example, a functionalization reagent comprising a first ionophore, to form the first functionalized region, and Impregnating the untreated membrane in a second region with a second functionalization reagent, for example, a functionalization reagent comprising a second ionophore, to form the second functionalized region.

To carry out these impregnation steps, the untreated membrane can be arranged in a microfluidic structure which has a first fluid chamber which is closed by the first region of the untreated membrane and has a second fluid chamber which is closed by the second region of the untreated membrane. The first functionalization reagent can be conducted through the first fluid chamber to the untreated membrane, and the second functionalization reagent can be conducted through the second fluid chamber to the untreated membrane.

For impregnating a plurality of regions of the untreated membrane, the microfluidic structure may in each case have a plurality of such fluid chambers arranged next to one another.

The impregnation of the untreated membrane in the first and the second regions of the untreated membrane, and possibly in other regions of the untreated membrane, may occur simultaneously. Alternatively, the individual regions of the membrane to be functionalized can be impregnated successively.

The microfluidic structure may comprise a fluidic body which has a substantially planar surface abutting against a front side of the untreated membrane and in which a first depression forming the first fluid chamber and a second depression forming the second fluid chamber are formed. For impregnating further regions of the untreated membrane, the fluidic body can have a plurality of fluid chambers corresponding to the number of further regions to be impregnated. In this case, further functionalization reagents are conducted through these further fluid chambers to the untreated membrane. If further fluid chambers are present, they can be designed identically to the first and second fluid chambers. Supply and discharge channels formed in the fluidic body for the functionalization reagents can open into the depressions forming the fluid chambers.

In addition, the microfluidic structure may comprise a base body having a substantially planar surface abutting against a rear side of the untreated membrane such that the untreated membrane is held between the fluidic body and the base body.

The base body may comprise a first fluid receptacle or a first fluid discharge line covered at least by a partial region of the first functionalized region of the untreated membrane, and wherein the base body comprises a second fluid receptacle or a second fluid discharge line covered at least by a partial region of the second functionalized region of the untreated membrane. In this way, a functionalization reagent which passes through the untreated membrane during impregnation thus passes into the fluid receptacles or the fluid discharge lines and can be conducted away from there, for example, into one or more collecting containers. When the first and the second functionalization reagents and, where applicable, further functionalization reagents are collected separately from one another in different collecting containers, recycling and/or reuse is possible. Advantageously, a negative pressure can be generated during the impregnation of the untreated membrane by supplying functionalization reagents to the regions of the untreated membrane to be impregnated to the fluid receptacles or fluid discharge lines in the base body, in order to suck the functionalization reagents through the untreated membrane into the fluid receptacles or fluid discharge lines.

The production of the sensor element body may comprise the following steps:

Applying a polymer layer onto a surface of a base body having at least one first and one second lead, e.g., in the form of conductor tracks, as first and second conductors;

Doping the polymer layer in a first partial region which at least partially covers the first lead and in a second partial region which is separate from the first partial region and at least partially covers the second lead; and Placing the membrane on the polymer layer in such a way that the first partial region is covered by the first functionalized region of the membrane and that the second partial region is covered by the second functionalized region of the membrane.

Alternatively, production of the sensor element body may comprise the following steps:

Applying a polymer layer, which is formed by at least two island-shaped, separate and electrically insulated layer elements of an electrically and/or ionically conductive polymer, onto a surface of a base body having at least one first and one second lead, e.g., in the form of conductor tracks, as first and second conductor, wherein a first island-shaped layer element is in contact with the first lead, and a second island-shaped layer element is in contact with the second lead; and Placing the membrane on the polymer layer such that the first island-shaped layer element is covered by the first functionalized region of the membrane, and the second island-shaped layer element is covered by the second functionalized region of the membrane.

The doped regions of the polymer layer or the island-shaped, separate layer elements can be formed from a doped, intrinsically conductive polymer, for example, one of the polymers mentioned above.

The production of the sensor element body can comprise the generation of a cavity-forming structure on a base plate, for example, by means of 3-D printing or injection molding. The production of the sensor element body can also comprise the integration of an electrical lead serving as a reference half-cell in the form of a pseudo reference electrode into the sensor element body, for example, by a multicomponent printing method or a multicomponent injection molding method or by overmolding the electrical lead.

Advantageously, at least two electrical leads for forming the conductors of the sensor element can be arranged on a front side of the base plate, said electrical leads being electrically conductively connected, via through-connections arranged in the base plate, to contact points arranged on a rear side of the base plate, wherein creating the cavity-forming structure comprises forming cavity walls surrounding the electrical leads such that at least one electrical lead is disposed in each cavity. The electrical leads can consist, for example, of a metal or graphite.

In a further step, the cavities can be filled with an internal electrolyte, for example, a liquid internal electrolyte. This is preferably done without bubbles. The internal electrolyte can also be thickened by means of a polymer additive, so that it is viscous or no longer capable of flowing.

Alternatively, the cavities can be filled with an electrically and/or ionically conductive polymer, e.g., a doped, intrinsically conductive polymer, such that the conductive polymer fills the cavity up to the edge and contacts the electrical lead arranged in the cavity.

Lastly, the cavities are closed by the membrane which lies against the substantially planar surface, wherein a first of the cavities is covered at least by a partial region of the first functionalized region of the membrane, and a second of the cavities is covered at least by a partial region of the second functionalized region of the membrane.

The above method step of closing the cavities may include attaching the membrane between the surface of the sensor element body and a support frame abutting against a membrane rear side facing away from the surface of the sensor element body.

The production of the sensor element may furthermore comprise the production of at least one reference half-cell integrated into the sensor element. For this purpose, the sensor body comprises at least one further cavity, which is intended for forming the reference half-cell. When the cavities of the sensor body are closed by the membrane, the membrane is oriented with respect to the sensor body in such a way that the at least one further cavity is covered by a non-functionalized region of the membrane. In a further step, the membrane is perforated in the region covering the at least one further cavity in order to generate a crossover (juncture) between a reference electrolyte contained in the interior of the cavity and a measuring medium contacting the membrane from the outside. Prior to the closing of the cavities of the sensor body, the at least one further cavity can be filled with a reference electrolyte. The reference electrolyte can be liquid, or be thickened by means of a polymer, for example, be incapable of flowing.

As an alternative or in addition to the reference half-cell, the sensor element may comprise an auxiliary electrode. This auxiliary electrode can serve as a reference electrode or as a pseudo reference. Alternatively or additionally, the auxiliary electrode may be used in an intermittent regeneration mode, as described further above. The auxiliary electrode can be designed, for example, as a metallic lead integrated into the sensor element body or as a metallic coating applied to the sensor element body, and can be connected to the sensor circuit.

BRIEF DESCRIPTION OF THE DRAWINGS

The present application is explained in further detail below on the basis of the exemplary embodiments shown in the figures. Shown are.

DETAILED DESCRIPTION

Figure 1:
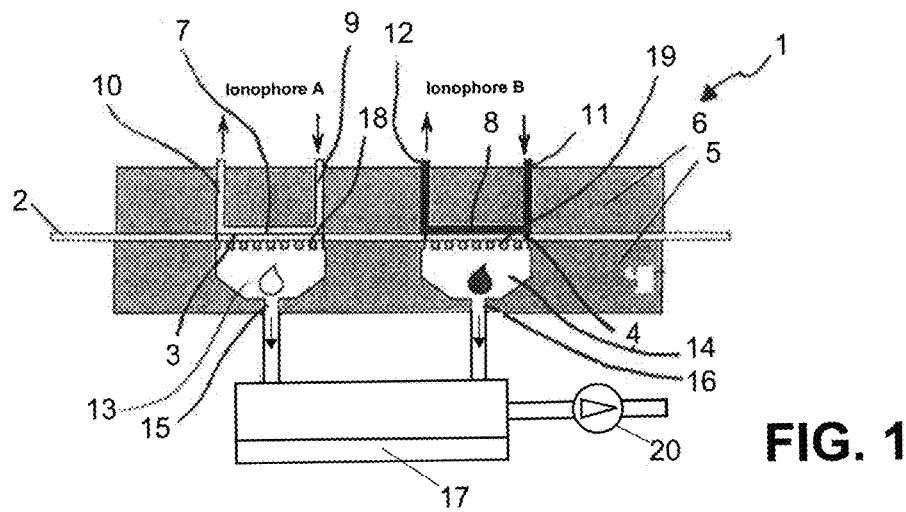
FIG. 1 shows a schematic sectional view of an arrangement for functionalizing an untreated membrane in at least two regions separated from one another.

FIG. 1 schematically shows a sectional view of an arrangement 1 for functionalizing an untreated membrane 2 in a first region 3 and a second region 4 separated therefrom. The arrangement 1 comprises a base body 5 and a fluidic body 6, between which the untreated membrane 2 is fixed. A front side of the untreated membrane 2 lies against a surface of the fluidic body 6, while the rear side of the untreated membrane 2 lies against a side of the base body 5, which side is opposite the fluidic body 6. The untreated membrane 2 can, for example, be a polymer membrane, e.g., of PVC, silicone, polyacrylate, polyurethane, or polytetrafluoroethylene (e.g., Teflon).

A first depression 7 and a second depression 8, which are closed by the untreated membrane 2, are formed in the surface of the fluidic body 6, which surface abuts against the front side of the untreated membrane 2. A supply line 9 and a discharge line 10, via which a first functionalization reagent can be introduced into the fluid chamber formed by the untreated membrane 2 and the depression 7 and discharged therefrom, open into the first depression 7. The supply line 9 and the discharge line 10 are formed as channels in the fluidic body 6. Correspondingly, a supply line 11 and a discharge line 12, via which a second functionalization reagent can be introduced into the fluid chamber formed between the depression 8 and the untreated membrane 2 and removed again from the fluid chamber, open into the depression 8. The first depression 7 and the second depression 8 can be designed identically, for example, with a circular, hexagonal, rectangular, or square cross-section. The cross-section of the first depression 7 and the second depression 8 determines the shape of the first region 3 and the second region 4, respectively, of the untreated membrane 2 functionalized using the functionalization reagents.

In the base body 5, a first fluid receptacle 13 and a second fluid receptacle 14 are formed, each being open toward the untreated membrane 2. A first fluid line 15 opens into the first fluid receptacle 13; a second fluid line 16 opens into the second fluid receptacle 14. The fluid lines 15, 16 connect the first and second fluid receptacles 13, 14, respectively, to a collecting container 17 and can be designed at least in sections as channels within the base body 5. The cross-section of the first fluid receptacle 13 in its region adjoining the untreated membrane 2 substantially corresponds to the cross-section of the opposite first depression 7 in the fluidic body 6 and tapers towards the mouth of the first fluid line 15. Correspondingly, the cross-section of the second fluid receptacle 14 corresponds to the cross-section of the opposite second depression 8 of the fluidic body 6. The cross-sections of the fluid receptacles 13, 14 can respectively be designed identically, for example. To mechanically support the untreated membrane 2, the first fluid receptacle 13 and the second fluid receptacle 14 each have a lattice- or net-like support structure 18, 19, on which the untreated membrane 2 rests, on their side open toward the untreated membrane 2. The first fluid line 15 and the second fluid line 16 and/or the collecting container 17 are connected to a pump 20 such that a negative pressure may, using the pump 20, be generated in the fluid lines 16, 17 or in the fluid receptacles 13, 14 connected thereto.

For functionalizing the untreated membrane 2 in the first region 3 and in the second region 4, the untreated membrane 2 may be impregnated with the same or different functionalization reagents. In the present example, the untreated membrane 2 is impregnated in the first region 3 with a first functionalization reagent and in the second region 4 with a second functionalization reagent different therefrom. To functionalize the first region 3 for subsequent potassium measurements, the first functionalization reagent can contain, for example, valinomycin. To functionalize the second region 4 for subsequent ammonium measurements, the second functionalization reagent may contain nonactin. A number of further ionophores for various ions are known in the art. In addition, the functionalization reagent may optionally contain a conducting salt and/or a softening agent.

In addition, the functionalization reagents may contain dyes. The dyes can serve to optically distinguish the functionalized regions from one another. The bleaching out or washing out of the dyes over the operating period of a sensor in which the functionalized membrane is later used can serve to monitor aging of the membrane. For this purpose, the dye may be formulated to wash out in the same or a corresponding way as the ionophore and/or conducting salt contained in the membrane selected, making the washing out of the dye a direct measure of the washing out of the ionophore or the conducting salt. Suitable dyes adapted to the particular combination of membrane, ionophore, conducting salt used, and the expected composition of the measuring medium and temperature specification of the sensor element can be determined by preliminary examinations.

The first functionalization reagent is conducted via the supply line 9 into the fluid chamber formed by the first depression 7 and the untreated membrane 2 that closes the first depression 7 and is discharged again via the discharge line 10. The functionalization reagent penetrates into the untreated membrane 2 in its region 3 covering the depression 7 and also passes through the untreated membrane 2 into the first fluid receptacle 13. To support the impregnation of the untreated membrane 2 with the first functionalization reagent, a negative pressure can be generated in the first fluid receptacle 13 by means of the pump 20. Functionalization reagent that entered the first fluid receptacle 13 passes via the first fluid line 15 into the collecting container 17.

Simultaneously with the impregnation of the untreated membrane 2 in the first region 3 or thereafter, the untreated membrane 2 can be impregnated in the second region 4 with the second functionalization reagent. For this purpose, similar to the impregnation of the first region 3, the second functionalization reagent is introduced via the supply line 11 into the fluid chamber formed by the second depression 8 and the untreated membrane 2 and is discharged again via the discharge line 12. To assist in the penetration of the second functionalization reagent into the region 4 of the untreated membrane 2, a negative pressure can be generated in the second fluid receptacle 14 by means of the pump 20. Functionalization reagent that entered the second fluid receptacle 14 is discharged via the fluid line 16 into the collecting container 17.

In the example shown here, the impregnation of the untreated membrane 2 in two different regions 3, 4 was described. With the method described here, it is also possible to functionalize any desired number of regions of an untreated membrane. For this purpose, accordingly, a device is used which is designed to be quite analogous to the device illustrated in FIG. 1, wherein a number of depressions with supply and discharge lines corresponding to the desired plurality of regions to be functionalized are formed in the fluidic body, and an identical number of fluid receptacles connected to a collection container are formed in the base body.

It is also possible to form the fluidic body from a plurality of fluidic body modules, which can be connected to one another in an, in an embodiment, releasable manner, and to form the base body from a plurality of—in such an embodiment, releasable—base body modules connectable to one another, wherein at least one depression having a supply line and a discharge line is formed in each fluidic body, and at least one fluid receptacle is formed in each base body with a discharge line opening thereinto. By virtue of this modular construction, the device can be configured for impregnation of any number of regions of an untreated membrane.

The impregnation takes place over a predetermined period of time, which may be predetermined, for example, based upon preliminary experiments with the specific functionalization reagent and the polymer material of the untreated membrane. After an optional subsequent cleaning and, if required, drying/aftertreatment process, a modified membrane 2' thus produced with functionalized regions 3 and 4 can be further processed and used to produce a sensor element which allows the quantitative detection of a plurality of different ions.

The production of such a sensor element is described below with reference to FIG. 2A through FIG. 2D.

Figure 2A:
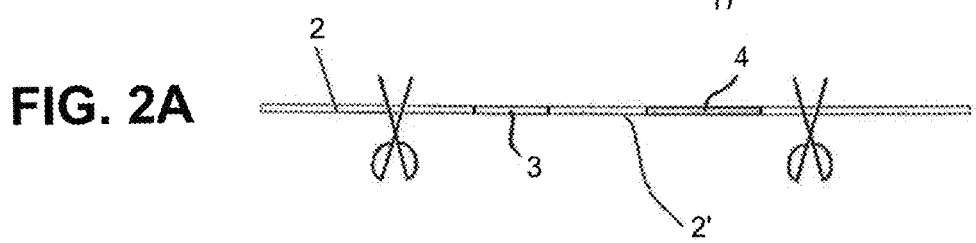
FIGS. 2A-2D shows a schematic illustration of a method for producing a sensor element with several ion-selective electrodes.

In the first step, the membrane 2' with a first functionalized region 3 and a second functionalized region 4 is prepared for installation. This preparation may comprise, for example as illustrated in FIG. 2A, cutting off the membrane 2' from a larger membrane piece 2. As described herein, the membrane 2' can have further functionalized regions in addition to the regions 3 and 4, requiring further cuts.

Figure 2B:
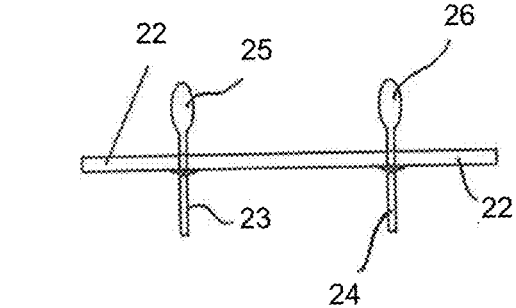

In a second step, a base plate 22 is provided in which, in the example shown in FIG. 2B, a first conductor 23 and a second conductor 24 are arranged. In certain embodiments, further electrodes may be present. The number of conductors corresponds to the number of half-cells that the sensor element to be produced is to have. In the present example, the conductors 23, 24 are configured as wires, e.g., silver wires, which are each coated in an end portion 25, 26 with a silver halide salt, for example, silver chloride. The conductors 23, 24 may alternatively be designed as conductor traces on the base plate 22, where the base plate 22 is a circuit board, for example, made of a fiber-reinforced plastic. The conductors 23, 24 are passed through through-connections of the circuit board and are electrically contacted or contactable on the rear side, i.e., on the side of the base plate 22 opposite the coated portion 25, 26 of the conductors 23, 24.

Figure 2C:
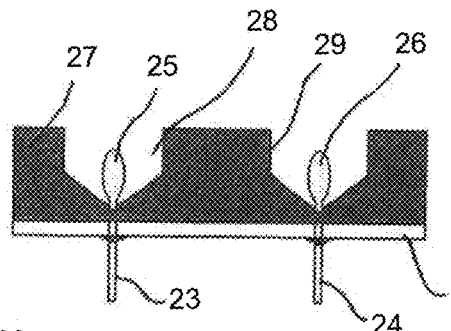

Referring to FIG. 2C, in a third step, a structure 27 is formed on the base plate 22 having a surface that runs substantially parallel to the base plate 22 and in which depressions that are open at the top are formed. The depressions have a cross-section that substantially corresponds to the cross-section of the functionalized regions 3, 4 of the membrane 2'. These depressions form cavities 28, 29 surrounding the conductors 23, 24, respectively, such that, in the present example, the coated portions 25, 26 of the conductors 23, 24 are arranged within the cavities 28, 29, respectively. The cross-section of the depressions can also be smaller than the cross-section of the functionalized regions 3, 4 of the membrane 2'. The structure 27 can be produced, for example, by injection molding, e.g., by overmolding the conductors 23, 24 present in the base plate 22. The structure 27 can be made of an electrically non-conductive or a negligibly electrically conductive polymer material. In an alternative embodiment, base plate 22 and structure 27 can also be produced from an electrically insulating ceramic.

The distance of each cavity 28, 29 from the other cavities in the structure 27 and the distance of each conductors 23, 24 from the other conductors are dimensioned such that when the membrane 2' is placed on the surface of the structure 27 running parallel to the base plate 22, a functionalized region 3, 4 of the membrane 2' respectively covers a cavity 28, 29. In the present example with two cavities shown, the distance between the first cavity 28 and the second cavity 29 is thus substantially the same as the distance between the first functionalized region 3 and the second functionalized region 4 of the membrane 2'.

Figure 2D:
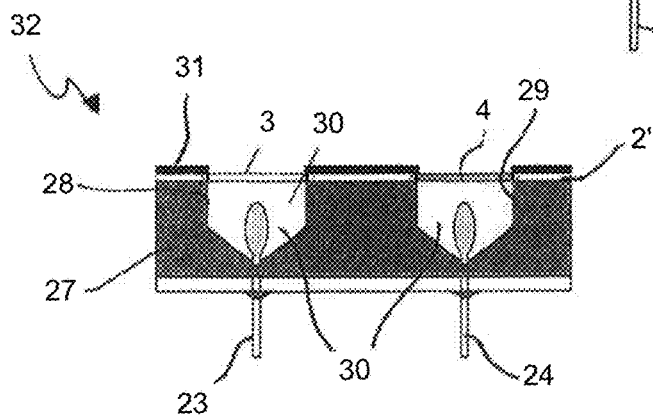

Referring to FIG. 2D, in the next step, the cavities 28, 29 are filled with an electrolyte 30. In at least one embodiment, the electrolyte 30 has the same composition in all cavities 28, 29. In certain embodiments, the cavities 28, 29 may be filled with electrolytes of different compositions. In the present example, an aqueous solution having a high concentration of KCl is filled into both cavities 28, 29. The filling is preferably effected in a gas-bubble-free manner. In an alternative embodiment, the electrolyte may be thickened by adding a polymer.

Afterwards, the membrane 2' is placed on the surface of the structure 27, as shown in FIG. 2D, and fixed by means of a support structure 31. In such an embodiment, the first functionalized region 3 comes to lie above the first cavity 28, and the second functionalized region 4 comes to lie above the second cavity 29, such that the functionalized regions 3, 4 close the cavities 28, 29 from above. The support structure 31 has continuous openings, the size and distances of which are matched to the distances between the cavities 28, 29 and the functionalized regions 3, 4 of the membrane 2' such that the openings leave exposed at least one partial region of the functionalized regions 3, 4 in each case. Advantageously, a slight vacuum may be applied to the cavities 28, 29 to avoid the formation of gas bubbles in the cavities 28, 29. Alternatively, to ensure the absence of bubbles in the electrolyte contained in the cavities 28, 29, the structure 27 as a whole can be immersed in an electrolyte bath, and the membrane 2' can be applied to the surface of the structure 27 in the electrolyte bath and pressed there. A sensor element 32 thus formed can subsequently be removed from the electrolyte bath and rinsed.

The sensor element 32 thus formed thereby comprises two or more ion-selective electrodes, the ion-selective membranes of which are formed by the functionalized regions 3 and 4 of the membrane 2'. The conductors 23, 24 which dip into the internal electrolyte 30 and which can be contacted from the rear side of the base plate 22 serve to discharge the half-cell potentials of the ion-selective electrodes.

In an alternative embodiment, a sensor element having two or more ion-selective electrodes with solid conductors, i.e., with conductors that do not contact the respective functionalized regions of the membrane via an electrolyte, as in the example described above, but via an electrically and/or ionically conductive solid compound, can be produced in a similar manner. For this purpose, the individual manufacturing steps described in FIGS. 2A-2D can be carried out in the same way as described above. However, the cavities 28, 29 are filled with an electrically and/or ionically conductive polymer, e.g., a doped, intrinsically conductive polymer, instead of with an electrolyte solution. In such an embodiment, the cavities 28, 29 may be somewhat flatter than in the schematic representation of FIGS. 2C and 2D (cf. FIG. 5). In such a method variant, the conductors 23, 24 are advantageously formed on the base plate 22 as conductor traces that are electrically conductively connected to contact points on the rear side of the base plate 22 via through-connections.

Figure 3:
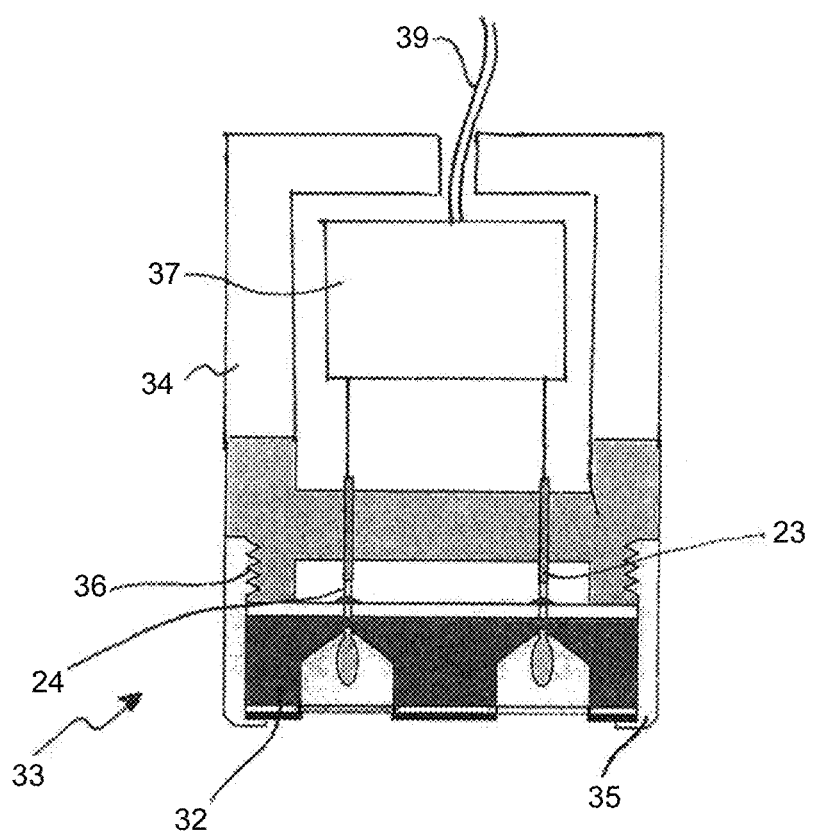
FIG. 3 shows a schematic illustration of a sensor with an exchangeable sensor element for determining at least two different measurands according to a first exemplary embodiment.

FIG. 3 shows a sensor 33 with the sensor element 32 that, in the present example, is replaceably fastened to a sensor body 34. For this purpose, the sensor element 32 is fixed in a union nut 35 such that the sensor element 32 and the union nut 35 form a replaceable cap which can be releasably fastened to the sensor body 34 by means of a screw connection 36 or another suitable connection. The sensor body 34 comprises a housing and a sensor circuit 37 that is arranged in the housing and electrically conductively connected to electrical contacts of the conductors 23, 24. The electrical contact between sensor circuit 37 and conductors 23, 24 can be effected, for example, by means of a plug connector 38. The sensor circuit 37 is connected wirelessly or, as in the present example, via electrical lines 39 to superordinate electronics (not shown), e.g., a measuring transducer or a process control computer or a controller.

As described in connection with FIG. 2D, any combination of a functionalized region 3, 4, the membrane 2', and the conductors 23, 24 electrically or electrolytically conductively connected to the regions 3, 4 forms an ion-selective electrode which can be switched as a potentiometric half-cell. In the present example, the functionalized regions 3, 4 are functionalized with different ionophores such that the half-cell potentials of the different half-cells depend upon concentrations of different ions in a measuring medium contacting the membrane 2'. For example, the half-cell potential that can be tapped against a reference potential at the first conductor 23 may be dependent upon the concentration of sodium ions in the measuring medium, while the half-cell potential which can be tapped against a reference potential at the second conductor 24 may depend upon the concentration of ammonium ions in the measuring medium.

The sensor circuit 37 may be designed to detect the half-cell potentials of the individual half-cells formed in the sensor element against a reference potential, said half-cell potentials being detectable at the conductors 23, 24 of the sensor element. The reference potential can be provided by a reference half-cell brought into contact with the measuring medium simultaneously with the half-cells formed in the sensor element 32. The sensor circuit 37 may be further configured to generate a measurement signal respectively for all half-cells, which measurement signal represents a potential difference between a half-cell and the reference half-cell, and to output the measurement signal or all measurement signals to the superordinate electronics. Thus, the sensor element 32 with the half-cells formed therein, the reference half-cell, and the sensor circuit 37 form a potentiometric multianalyte sensor, i.e., a sensor with which at least two (as in the present example) or, depending upon the number of half-cells formed in the sensor element 32, a plurality of measurement signals are generated, wherein each measurement signal represents the concentration of a specific ionic analyte, and various of the measurement signals represent the concentrations of different ionic analytes.

The superordinate electronics may be configured to determine measured values of the concentrations of the ionic analytes on the basis of the measurement signals. This determination can be done on the basis of a calibration function stored in a memory of the superordinate electronics or on the basis of a calibration function stored in a memory of the sensor circuit 37. In certain embodiments, the measured values may be determined directly in the sensor circuit 37.

In addition, a temperature sensor (not shown), which may also be electrically conductively connected to the sensor circuit 37, may also be integrated into the sensor element 32. In such an embodiment, the sensor circuit 37 may be configured to generate a temperature measurement signal of the temperature sensor and, optionally, output it to the superordinate electronics. In this way, temperature compensation of the measured concentration values is possible. This compensation can be performed either by the superordinate electronics or by the sensor circuit 37.

The reference half-cell may be integrated into the sensor element 32 (not shown in FIG. 3). In an alternative embodiment, the reference half-cell may be formed in a separate housing which is connected or connectable to the housing of the sensor body 34. The reference half-cell may be configured, for example, as a reference electrode of the second type, for example, as a silver/silver chloride reference electrode. In such an embodiment, the sensor circuit 37 is electrically conductively connectable or connected to the reference element of the reference half-cell to detect potential differences between the reference element and the individual half-cells of the sensor element 32.

Figure 4:
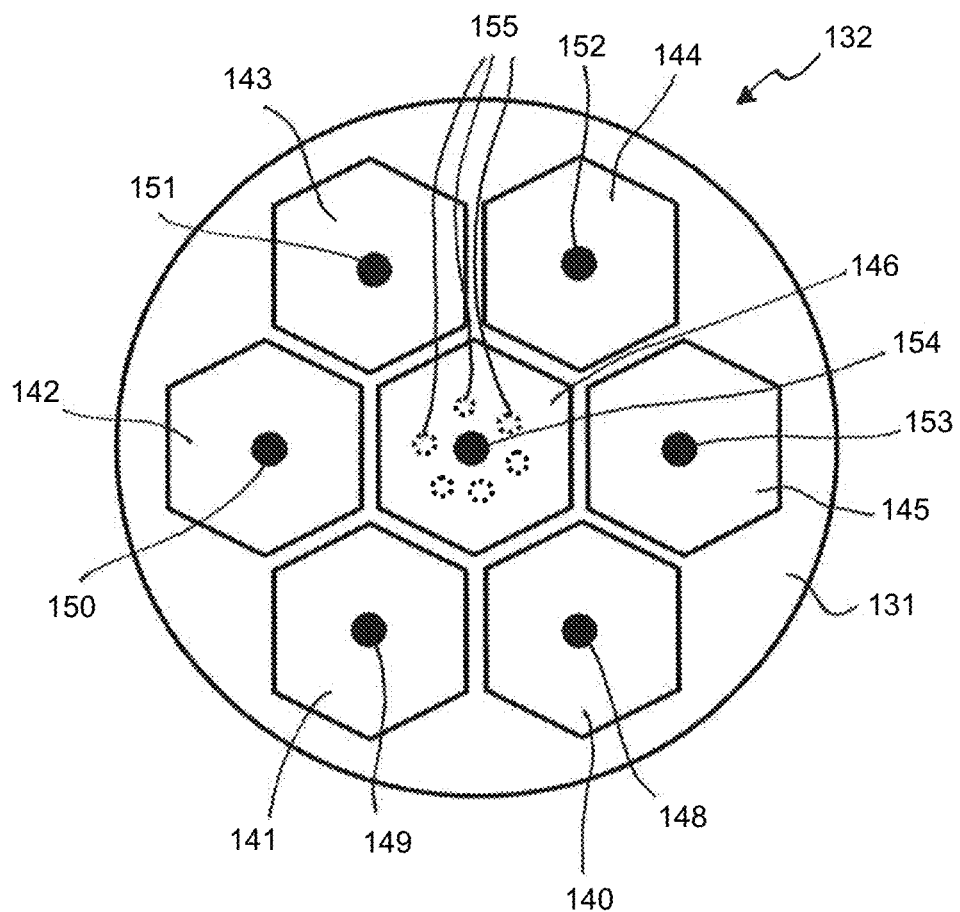
FIG. 4 shows a schematic illustration of a sensor element having a plurality of ion-selective electrodes and a reference half-cell according to a second exemplary embodiment.

In an advantageous, miniaturized embodiment, the reference half-cell is integrated into the sensor element 32. An example of such a sensor element 132 is shown schematically in FIG. 4 in a cross-sectional view. A cross-section through a structure 131 of the sensor element 132 is illustrated, in which structure 131, in the example shown here, seven hexagonal cavities 140, 141, 142, 143, 144, 145, 146 arranged in a honeycomb-like manner are formed. A conductor 148, 149, 150, 151, 152, 153, 154 is arranged in each cavity 140, 141, 142, 143, 144, 145, 146 and may be electrically contacted from the rear side (not visible in FIG. 4) of the sensor element 132. Each cavity 140, 141, 142, 143, 144, 145, 146 is, moreover, filled with an electrolyte thickened, in the present example, by a polymer. In the present example, all conductors 148, 149, 150, 151, 152, 153, 154 consist of a silver wire provided with a silver chloride coating in a portion protruding into the cavities 140, 141, 142, 143, 144, 145, 146. An ion-selective electrode is formed in each of the cavities 140, 141, 142, 143, 144, 145, 146, i.e., the regions of the membrane (not visible in the cross-sectional view) covering the cavities are correspondingly functionalized with an ionophore configured to detect a particular ionic analyte in each case.

A reference half-cell may be formed in the centrally located cavity 146. The reference element 154 of the reference half-cell is designed like the remaining conductors 148, 149, 150, 151, 152, 153, viz., as silver wire with a silver chloride coating in a portion protruding into the cavity 146. The region of the membrane covering the cavity 146 is not specifically functionalized, but instead has one or more pores 155. Because the membrane cannot be seen in the cross-sectional view in FIG. 4; the pores 155 are indicated by dashed lines. Via the pores 155, the reference electrolyte contained within the cavity 146 is in electrolytic contact with a measuring medium contacting the membrane.

The sensor element 132 may be produced using the method described with reference to FIGS. 2A-2D, wherein six regions of an untreated membrane, which are intended to cover cavities provided in the sensor element to be produced, are functionalized by means of selected functionalization reagents. The region intended to cover the cavity forming the reference half-cell is perforated before or after placement of the membrane on the structure forming the cavities to create the pores for the reference half-cell. All other manufacturing steps are carried out analogously to the method described above.

Figure 5:
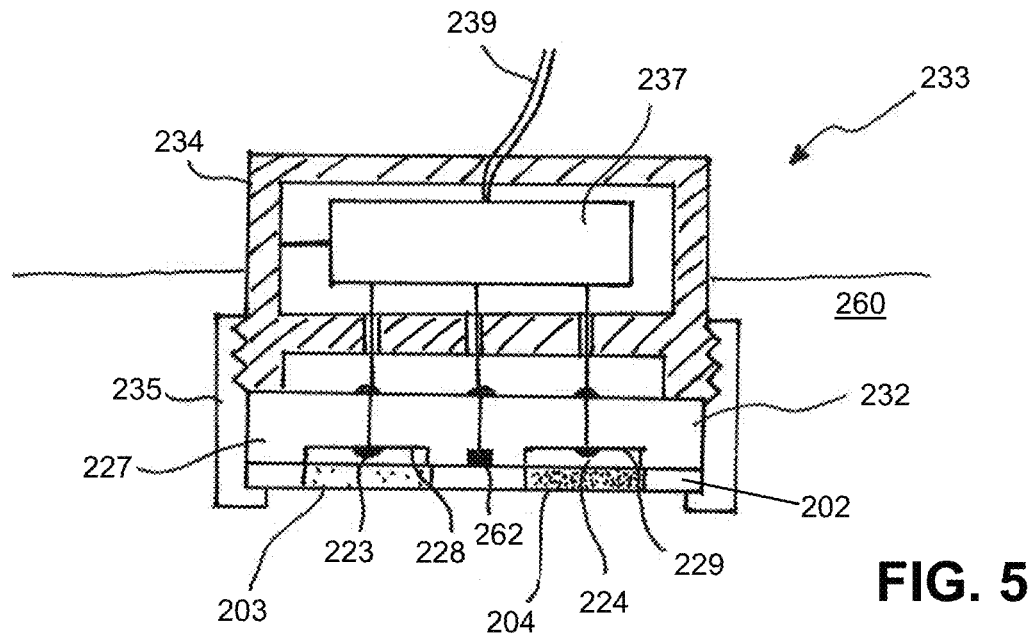
FIG. 5 shows a schematic illustration of a sensor having an exchangeable sensor element for determining at least two different measurands according to a third exemplary embodiment.

A further exemplary embodiment of a sensor 233 with a sensor element 232 is shown schematically in FIG. 5 in longitudinal sectional view. The sensor element 232 may be replaceably fastened with a union nut 235 to a sensor body 234. The sensor body 234 may have a metallic housing in which a sensor circuit 237 is arranged.

The sensor element 232 includes a structure 227, which may be formed, for example, from an electrically insulating plastic, such as a circuit board material, or from an insulating ceramic, and in the front side of which, facing the measuring medium 260 in operation, are arranged depressions which form flat cavities 228, 229. Electrically conductive conductors 223, 224 designed as conductor traces on the structure 227 are arranged on the base of these cavities. The cavities 228, 229 are filled with an intrinsically conductive polymer, e.g., PEDOT:PSS, which covers the conductors 223, 224 such that there is an electrically conductive contact between the conductors 223, 224 and the polymer. A membrane 202 having a first functionalized region 203 and a second functionalized region 204 is placed on the front side of the structure 227. The first functionalized region 203 includes a first ionophore and, optionally, a conducting salt and/or a softening agent, which enable to determine a first ionic analyte. The second functionalized region 204 includes an ionophore different from the first ionophore and, optionally, a conducting salt and/or a softening agent, which enable to determine a second ionic analyte. The conductive polymer in the cavities 228, 229 contacts the rear side of the functionalized regions 203, 204 covering the cavities 228, 229 such that the conductor 223 is in electrically conductive contact with the first functionalized region 203, and the conductor 224 is in electrically conductive contact with the second functionalized region 204.

The conductors 223, 224 are connected, via through-connections in the structure 227, to contact points on the rear side of the structure 227. The contact points are in turn electrically conductively connected to inputs of the sensor circuit 237. Another input of the sensor circuit 237 is electrically conductively connected to a housing exterior of the metallic housing of the sensor body 234, which housing exterior is in contact with the measuring medium 260 during measurement operation. The sensor circuit 237 is connected via a cable connection 239 to a further data processing unit, e.g., a measuring transducer, for communication, to output measurement signals to the further data processing unit. The sensor circuit 237 may also be powered via the cable connection 239.

A half-cell potential developed by interaction of the first ionophore with a first ionic analyte contained in the measuring medium 260 can be detected by the sensor circuit 237 via the first conductor 223. A half-cell potential developed by interaction of the second ionophore with a second ionic analyte contained in the measuring medium 260 can, correspondingly, be detected by the sensor circuit 237 via the second conductor 224. In the exemplary embodiment shown in FIG. 5, the pseudo-reference potential developed from contact of the metallic housing 234 with the measuring medium 260 serves as reference potential for the sensor circuit 237. The sensor circuit 237 converts the detected potential differences into digital signals and outputs them via the cable connection 239 to the further data processing unit. The latter determines measured values of the concentrations of the first and second analytes from the digital signals.

The sensor element 232 additionally comprises a temperature sensor 262 that may be embedded in a web of the structure 232 arranged between the cavities 228, 229. The temperature sensor 262 is connected to the sensor circuit 237, which is furthermore designed to output the measurement signal outputted by the temperature sensor 262 to the connected further data processing unit. The temperature measurement signal or a measured temperature value derived therefrom is used by the further data processing unit for temperature compensation of the measured concentration values of the first and second analytes.

As in the exemplary embodiment described above with reference to FIG. 3, the sensor element 232 of the present example can also include more than two ion-selective solid-conductor electrodes to correspondingly provide a plurality of different ion concentrations as measurands.

Figure 6:
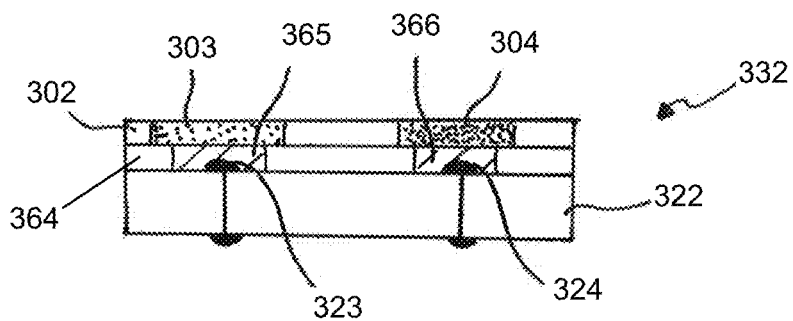
FIG. 6 shows a schematic illustration of a sensor element according to a fourth exemplary embodiment.

FIG. 6 schematically shows a further exemplary embodiment of a sensor element 332 in longitudinal sectional view. Sensor element 332 includes a base plate 322, which may, for example, be a conventional circuit board. Conductor traces are arranged on the base plate 322 serve as conductors 323, 324 for the sensor element and are connected to contact points on the rear side of the circuit board.

Disposed on the base plate 322 is a closed polymer layer 364, having individual doped regions 365, 366, in which the polymer layer 364 has a substantially higher electrical conductivity than the other regions of the polymer layer 364. For example, the polymer layer 364 may be formed of an intrinsically conductive polymer doped in the doped regions with a dopant that provides further charge carriers. A polymer membrane 302, e.g., of PVC, may be arranged on the polymer layer 364. The polymer membrane 302 has functionalized regions 303, 304, each of which is in contact with one of the doped regions 365, 366. The functionalized regions 303, 304 each include at least one ionophore or one functional group serving as ionophore, whose interaction with an ionic analyte leads to the formation of a half-cell potential dependent upon the concentration of the analyte in a measuring medium. The conductors 323 and 324 are thus in electrically conductive contact with the functionalized regions 303, 304 of the polymer membrane 302 via the doped regions 365, 366 of the polymer layer 364, and can thus serve to detect the half-cell potentials with respect to a reference potential. As shown in the embodiments of FIG. 3 and/or FIG. 5, the sensor element 332 may be connected to a sensor body which has a sensor circuit that can be connected to the conductors 323 and 324.

The membrane can be fixedly connected to the underlying structure carrying the conductors by means of a suitable form-fitting or material-fit connection technique, for example, clamping, welding, or adhesive bonding.

Figure 7:
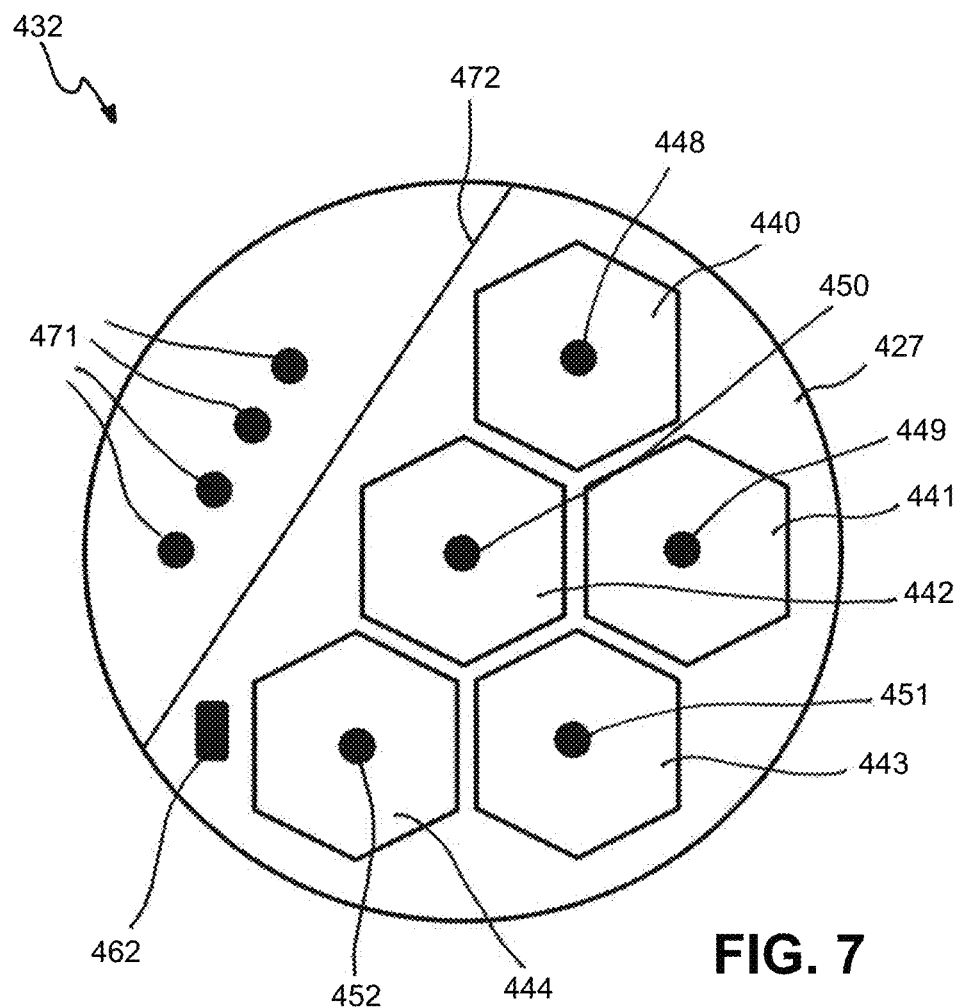
FIG. 7 shows a schematic illustration of a sensor element according to a fifth exemplary embodiment.

FIG. 7 shows a cross-sectional view of a further exemplary embodiment of a sensor element 432, which can be connected to a sensor body containing a sensor circuit, as illustrated, for example, in the embodiments of FIG. 3 and/or FIG. 5, to form a multiparameter sensor having a multiplicity of ion-selective electrodes for measuring different measurands as measuring half-cells. The sensor element 432 comprises a structure 427 in which five hexagonal cavities 440, 441, 442, 443, 444 are formed. FIG. 7 shows a cross-section through the structure 427.

Arranged within each of the cavities 440, 441, 442, 443, 444 is a conductor 448, 449, 450, 451, 452, e.g., in the form of a wire or in the form of a conductor trace, which is electrically conductively connected to contact points (not visible) arranged on the rear side of the structure 427. The cavities 440, 441, 442, 443, 444 are filled with an electrolyte or a conductive polymer such that the conductors 448, 449, 450, 451, 452 are electrically or electrolytically conductively connected in the manner described above to a membrane (not visible) closing the cavities. As in the previously described exemplary embodiments, the membrane has functionalized regions, wherein one of the functionalized regions in each case covers one of the cavities 440, 441, 442, 443, 444 such that an ion-selective electrode is formed by each combination of a conductor and a functionalized region of the membrane.

A temperature sensor 462 may be embedded in the structure 427 and can be contacted from the rear side of the structure 427 and connected to the sensor circuit. In addition, four metallic auxiliary electrodes 471, e.g., made of a metal such as gold, silver, copper, or platinum, are embedded in the structure. The structure 427 may expose an end face of the embedded auxiliary electrodes 471 such that the electrodes are embedded in the surface of the structure 471 facing the measuring medium without elevations, edges, or gaps.

The membrane lying on the structure 427 (not visible in the sectional view of FIG. 7) is connected thereto by a material connection, e.g., gluing or welding, such that no measuring medium can penetrate between the membrane and the structure 427, and thus into the cavities 440, 441, 442, 443, 444. In the exemplary embodiment of FIG. 7, the membrane does not completely cover the surface of the structure 427 but leaves the auxiliary electrodes 471 exposed, which is indicated by a line 472 illustrated in FIG. 7, which represents the course of an edge of the membrane. The conductors 448, 449, 450, 451, 452 and the auxiliary electrodes 471 may be electrically conductively connected to the sensor circuit.

The auxiliary electrodes 471 may serve as pseudo-reference electrodes providing a reference potential for detecting the half-cell potentials at the conductors 448, 449, 450, 451, 452. The sensor circuit is correspondingly designed to detect the potential differences between each conductor and one of the auxiliary electrodes 471 as a measure of the concentrations of different analyte ions. By means of the measurement signal of the temperature sensor 462, the sensor circuit or a device connected thereto for further measured value processing can perform a temperature compensation of the measured values of the ion concentrations.

Additionally, in the present exemplary embodiment, the sensor circuit is designed to apply a predetermined voltage between one or more of the auxiliary electrodes 471 and one or more of the conductors 448, 449, 450, 451, 452, such as all conductors 448, 449, 450, 451, 452. This applied voltage takes place in an intermittent regeneration mode carried out between two phases (periods) of a measurement operation, in which potential differences between the auxiliary electrodes 471 and the conductors 448, 449, 450, 451, 452 are detected, and measured values are determined therefrom by generating a regenerative current flow between the conductors 448, 449, 450, 451, 452 and the auxiliary electrodes 471 by applying the predetermined voltage to compensate for polarization effects which can occur during measurement operation.

The auxiliary electrodes 471 may additionally be used to perform conductivity measurements. For this purpose, the sensor circuit can be designed to apply an alternating voltage to two of the auxiliary electrodes 471, to immerse it into the measuring medium contacting the electrodes, and to detect the voltage drop in the measuring medium via the two further auxiliary electrodes. The sensor circuit or a further measurement signal processing unit connected to the sensor circuit may, moreover, be configured to perform temperature compensation of the measured conductivity values based upon the signal of the temperature sensor 462.

The invention claimed is:

1. A sensor element comprising:
a sensor element body including an electrically conductive first conductor and an electrically conductive second conductor insulated from the first conductor; and
a polymer membrane including a first functionalized region and a second functionalized region different from the first functionalized region, the membrane seated on the sensor element body,
wherein the first conductor is electrically and/or electrolytically conductively in contact with the first functionalized region of the membrane such that a first ion is detectable by the sensor element,
wherein the second conductor is electrically and/or electrolytically conductively connected to the second functionalized region of the membrane such that a second ion different from the first ion is detectable by the sensor element,
wherein the sensor element body includes a surface on which a polymer layer is disposed, wherein the polymer layer has an electrically and/or ionically conductive first partial region and an electrically and/or ionically conductive second partial region, and
wherein the membrane seats on the polymer layer such that the first partial region of the polymer layer contacts the first functionalized region of the membrane and the second partial region of the polymer layer contacts the second functionalized region of the membrane.

2. The sensor element of claim 1, wherein the first functionalized region includes first molecules contained in the membrane or first functional groups bonded to the membrane that interact physically or chemically with a first analyte, and
wherein the second functionalized region includes second molecules contained in the membrane or second functional groups bonded to the membrane that interact physically or chemically with a second analyte different from the first analyte.

3. The sensor element of claim 1, wherein the first partial region and second partial region of the polymer layer are formed of a doped, intrinsically conductive polymer.

4. The sensor element of claim 1, wherein the first partial region of the polymer layer is electrically insulated from the second partial region of the polymer layer.

5. The sensor element of claim 1, wherein the polymer layer is at least two separate and electrically insulated layer elements of an electronically and/or ionically conductive polymer, wherein a first layer element forms the first partial region of the polymer layer, and a second layer element forms the second partial region of the polymer layer.

6. The sensor element of claim 1, wherein the polymer layer is a closed polymer layer of an intrinsically conductive polymer that is doped in the first partial region and in the second partial region such that the polymer layer is electronically and/or ionically conductive in the first partial region.

7. The sensor element of claim 1, wherein the first conductor and second conductor are, in at least one portion, each configured as a conductor trace on the surface of the sensor element body, which portion is in contact with the polymer layer and is electrically conductively connected to a contact point on a side of the sensor element body opposite the membrane.

8. The sensor element of claim 1, wherein the surface of the sensor element body is substantially planar and includes at least two depressions, which define cavities separated from one another, wherein the membrane seats on the substantially planar surface of the sensor element body and covers the cavities, and wherein a first cavity of the cavities is covered at least partially by the first functionalized region of the membrane, and a second cavity of the cavities is covered at least partially by the second functionalized region of the membrane.

9. The sensor element of claim 8, wherein the polymer layer comprises:
a first electronically and/or ionically conductive polymer comprising the first partial region disposed adjacent the first cavity and contacting the first functionalized region of the membrane on a rear side thereof; and
a second electronically and/or ionically conductive polymer comprising the second partial region disposed adjacent the second cavity and contacting the second functionalized region of the membrane on the rear side,
wherein the first conductor is in contact with the first polymer, and the second conductor is in contact with the second polymer, and wherein the first and second conductors are each electrically conductively connected to an electrical contact point disposed outside the cavity.

10. The sensor element of claim 9, further comprising:
a first internal electrolyte contained in the first cavity and contacting the first functionalized region of the membrane on the rear side; and
a second internal electrolyte contained in the second cavity and contacting the second functionalized region of the membrane on the rear side,
wherein the first conductor is in contact with the first internal electrolyte, and the second conductor is in contact with the second internal electrolyte, and
wherein the first conductor and second conductor are each electrically conductively connected to the electrical contact point.

11. The sensor element of claim 8, further comprising a support structure, wherein the membrane is fixed between the surface of the sensor element body and the support structure abutting a rear side of the membrane, the rear side opposite the surface of the sensor element body, and wherein the support structure includes openings therethrough that leave at least partially exposed regions of the membrane that cover the cavities.

12. The sensor element of claim 1, wherein the sensor element body includes a plurality of electronically conductive conductors electrically insulated from each other, and wherein the membrane includes a plurality of functionalized regions, which include the first and second functionalized regions, wherein each of the plurality of functionalized regions is electrically and/or electrolytically conductively connected to one of the plurality of conductors.

13. The sensor element of claim 1, wherein the membrane includes a dye in the first and second functionalized regions.

14. A sensor comprising:
a sensor element including:

a sensor element body including an electrically conductive first conductor and an electrically conductive second conductor insulated from the first conductor; and a polymer membrane including a first functionalized region and a second functionalized region different from the first functionalized region, the membrane seated on the sensor element body, wherein the first conductor is electrically and/or electrolytically conductively in contact with the first functionalized region of the membrane such that a first ion is detectable by the sensor element, and wherein the second conductor is electrically and/or electrolytically conductively connected to the second functionalized region of the membrane such that a second ion different from the first ion is detectable by the sensor element, wherein the sensor element body includes a surface on which a polymer layer is disposed, wherein the polymer layer has an electrically and/or ionically conductive first partial region and an electrically and/or ionically conductive second partial region, and wherein the membrane seats on the polymer layer such that the first partial region of the polymer layer contacts the first functionalized region of the membrane and the second partial region of the polymer layer contacts the second functionalized region of the membrane;

a sensor body including a housing releasably connected to the sensor element; and a sensor circuit disposed in the housing and electrically conductively connected to the first conductor and the second conductor and to a reference half-cell, the sensor circuit configured to generate, on the basis of a potential difference between the first conductor and the reference half-cell, a first measurement signal dependent upon a concentration of a first analyte in a measuring medium contacting the sensor element and to generate, based upon a potential difference between the second conductor and the reference half-cell, a second measurement signal dependent upon a concentration of a second analyte in the measuring medium.

15. The sensor of claim 14, wherein:

the sensor circuit is further configured to operate in a regeneration mode and a measurement mode;

in the measurement mode, the sensor circuit generates the first measurement signal and the second measurement signal; and in the regeneration mode, the sensor circuit is configured to apply a predetermined voltage between the reference half-cell or an auxiliary electrode and the first conductor and/or second conductor.

16. The sensor of claim 14, further comprising an optical measuring transducer adapted to radiate measuring radiation onto the membrane and to detect converted radiation emitted from the membrane, wherein the membrane includes a dye that diffuses out of the membrane when in contact with the measuring medium and that converts the measuring radiation from the measuring transducer to converted radiation by interaction therebetween, the converted radiation detected by the measuring transducer and converted into a third measurement signal, and wherein the sensor circuit is configured to determine an age or a state of the sensor element and/or to predict a remaining service life of the sensor element based on the third measurement signal.

* * * * *